US008646383B1

(12) United States Patent
Howard (10) Patent No.: US 8,646,383 B1
(45) Date of Patent: Feb. 11, 2014

(54) SPIRAL OVEN APPARATUS AND METHOD OF COOKING

(76) Inventor: David Howard, Kellyville, OK (US)

( * ) Notice: Subject to any disclaimer, the term of this patent is extended or adjusted under 35 U.S.C. 154(b) by 666 days.

(21) Appl. No.: 12/559,793

(22) Filed: Sep. 15, 2009

(51) Int. Cl.
*A23L 3/18* (2006.01)
*A47J 37/04* (2006.01)
*A47J 37/07* (2006.01)

(52) U.S. Cl.
USPC ........ 99/443 C; 99/467; 99/443 R; 126/19 R; 126/21 A (58) Field of Classification Search
CPC ..... A21B 1/48; F25D 13/067; F25D 2400/22; B65G 2207/24
USPC ......... 62/380; 99/467, 443 C, 375; 126/19 R, 126/21 A; 198/778; 219/388, 392–394
See application file for complete search history.

(56) References Cited

U.S. PATENT DOCUMENTS

| 3,685,430 | A | * | 8/1972 | McBride ........................ 99/349 |
| 3,873,755 | A | | 3/1975 | McKay |
| 4,354,815 | A | | 10/1982 | Bardsley et al. |
| 4,582,484 | A | | 4/1986 | Sandor |
| 4,726,766 | A | * | 2/1988 | Stewart et al. ................ 432/133 |
| 4,829,158 | A | | 5/1989 | Burnham |
| 4,957,756 | A | | 9/1990 | Olander et al. |
| RE33,510 | E | * | 1/1991 | Williams ....................... 126/369 |
| 5,078,120 | A | | 1/1992 | Hwang |
| 5,109,758 | A | * | 5/1992 | Voegtlin ...................... 99/443 C |
| 5,189,948 | A | * | 3/1993 | Liebermann ................ 99/443 C |
| 5,243,962 | A | * | 9/1993 | Hwang ....................... 126/21 A |
| 5,259,302 | A | * | 11/1993 | Chen ............................... 99/405 |
| 5,322,007 | A | * | 6/1994 | Caridis et al. ................ 99/443 C |
| 5,335,590 | A | * | 8/1994 | Crump et al. ................... 99/479 |
| 5,407,692 | A | * | 4/1995 | Caridis et al. ................. 426/510 |
| 5,454,295 | A | * | 10/1995 | Cox et al. ......................... 99/332 |
| 5,463,938 | A | * | 11/1995 | Sarukawa et al. ............... 99/352 |
| 5,515,775 | A | * | 5/1996 | Crump et al. ................... 99/479 |
| 5,520,944 | A | | 5/1996 | Richardson et al. |
| RE35,259 | E | * | 6/1996 | Williams ....................... 126/369 |
| 5,694,835 | A | | 12/1997 | Mangina |
| 5,702,245 | A | * | 12/1997 | London ........................... 432/14 |
| 5,717,192 | A | * | 2/1998 | Dobie et al. .................. 219/681 |
| 5,741,536 | A | * | 4/1998 | Mauer et al. .................. 426/520 |
| 5,836,240 | A | * | 11/1998 | Kuenen ....................... 99/443 C |

(Continued)

FOREIGN PATENT DOCUMENTS

EP 1221575 B2 7/2004

OTHER PUBLICATIONS

FMC Foodtech, "Superior Cross-Belt Temeprature Control Improves Bacon Processing", Dec. 5, 2007, Publisher: FMC Technologies, Inc., Published in: US.

(Continued)

*Primary Examiner* — Henry Yuen
*Assistant Examiner* — Brett Spurlock
(74) *Attorney, Agent, or Firm* — GableGotwals (57) ABSTRACT

A spiral oven and a method of cooking a food product in a spiral oven using a cooking medium wherein (a) the food product is conveyed within the oven cooking chamber by a spiral conveyor having a plurality of spiral flights and (b) the cooking medium is discharged either upwardly and/or downwardly within, or laterally into, one or more vertical gaps between adjacent pairs of spiral flights using one or more delivery duct structures which extend inside the interior of the cooking chamber.

20 Claims, 5 Drawing Sheets

(56) References Cited

U.S. PATENT DOCUMENTS

| | | | | |
|---|---|---|---|---|
| 5,878,738 | A * | 3/1999 | Poirier | 126/19 R |
| 5,881,636 | A * | 3/1999 | Sweet et al. | 99/443 C |
| 5,942,265 | A * | 8/1999 | Roberds et al. | 426/59 |
| 5,960,703 | A * | 10/1999 | Jara et al. | 99/331 |
| 5,997,925 | A | 12/1999 | Wilson et al. | |
| 6,045,841 | A | 4/2000 | Singh | |
| 6,065,463 | A * | 5/2000 | Martin | 126/21 A |
| 6,132,783 | A * | 10/2000 | Rajapakse | 426/243 |
| 6,138,660 | A * | 10/2000 | Middleton, Jr. | 126/21 A |
| 6,146,678 | A | 11/2000 | Caridis et al. | |
| 6,244,168 | B1 * | 6/2001 | van de Vorst et al. | 99/443 C |
| 6,320,165 | B1 * | 11/2001 | Ovadia | 219/400 |
| 6,418,834 | B1 * | 7/2002 | Perrine | 99/334 |
| 6,494,131 | B2 * | 12/2002 | van de Vorst et al. | 99/443 C |
| 6,619,069 | B1 * | 9/2003 | Persson | 62/381 |
| 6,689,407 | B2 * | 2/2004 | Shefet et al. | 426/315 |
| 6,707,010 | B2 | 3/2004 | Kuenen | |
| 6,713,106 | B1 | 3/2004 | Underwood et al. | |
| 6,713,107 | B2 * | 3/2004 | Shefet et al. | 426/315 |
| 6,994,016 | B1 * | 2/2006 | Bunker et al. | 99/348 |
| 7,004,307 | B2 * | 2/2006 | Shefet et al. | 198/778 |
| 7,107,899 | B2 | 9/2006 | Nothum, Jr. | |
| 7,428,962 | B2 * | 9/2008 | Shefet et al. | 198/778 |
| 8,415,592 | B2 * | 4/2013 | Kuenen | 219/392 |
| 2002/0029698 | A1 * | 3/2002 | van de Vorst et al. | 99/477 |
| 2004/0096555 | A1 | 5/2004 | Gould | |
| 2005/0061629 | A1 * | 3/2005 | Shefet et al. | 198/778 |
| 2005/0092730 | A1 | 5/2005 | Nothum | |
| 2006/0032382 | A1 | 2/2006 | Nothum | |
| 2006/0070852 | A1 * | 4/2006 | Shefet et al. | 198/778 |
| 2006/0207436 | A1 | 9/2006 | Nothum | |
| 2007/0023413 | A1 | 2/2007 | Wilson | |

OTHER PUBLICATIONS

Ahmed Elamin, "Spiral Oven Reduces Operating Costs, Claims Manufacturer", Dec. 6, 2007, Publisher: Decisionnewsmedia, Published in: US.

Howard, Pending U.S. Appl. No. 12/716,517, for "Spiral Apparatus and Method for Temperature Processing of Food Products", filed Mar. 3, 2010.

Howard, Pending U.S. Appl. No. 12/728,678, for "Spiral Chiller Apparatus and Method of Chilling", filed Mar. 22, 2010.

\* cited by examiner

SPIRAL OVEN APPARATUS AND METHOD OF COOKING

FIELD OF THE INVENTION

The present invention relates to spiral ovens and to methods of cooking food products therein.

BACKGROUND OF THE INVENTION

Figure 1:
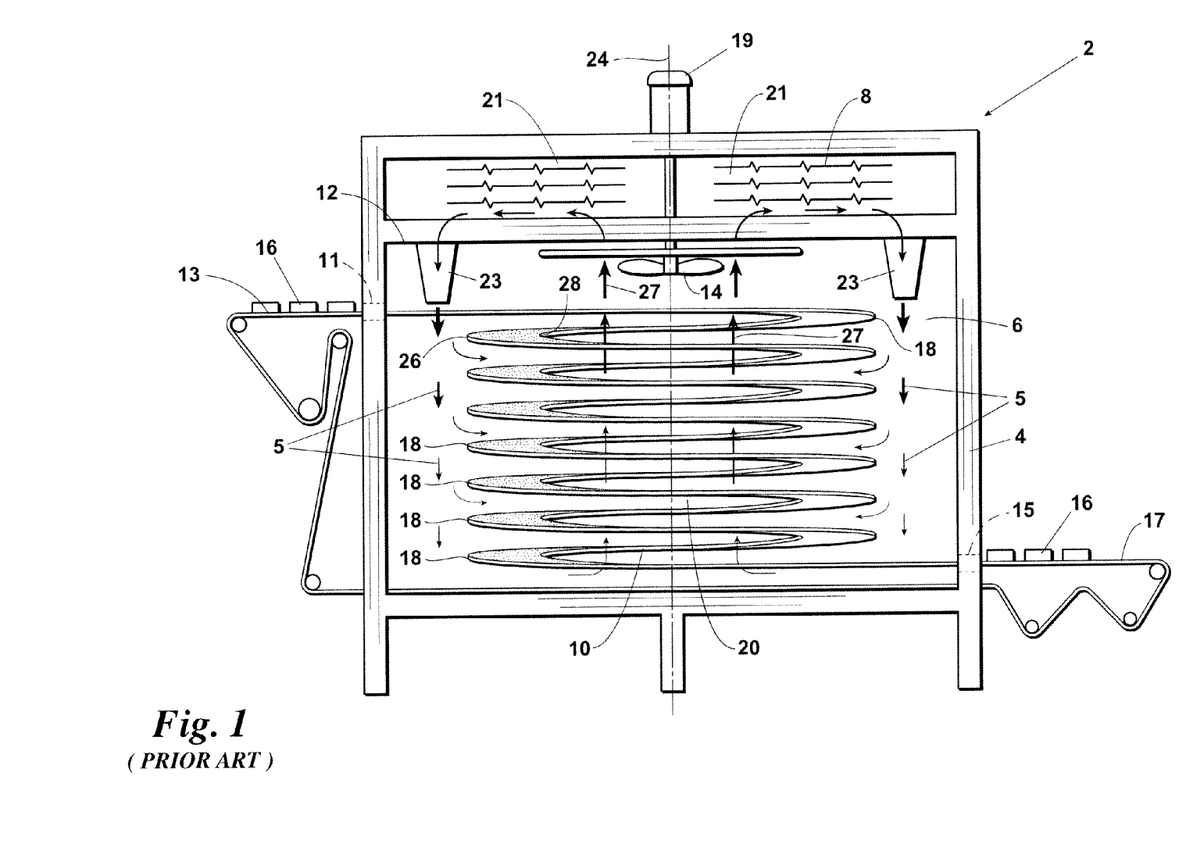
FIG. 1 is a cutaway elevational view illustrating a prior art spiral oven 2.

A prior art spiral oven 2 used for cooking food products is schematically illustrated in FIG. 1. The prior art spiral oven 2 comprises: a housing 4 having a lower cooking chamber 6 and an upper circulation and heating chamber 8; a spiral conveyor belt 10 within the cooking chamber 6 for carrying the food product during the cooking process; an upper cooking chamber ceiling 12 which separates the cooking chamber 6 from the upper circulation and heating chamber 8; an upper side opening 11 in a sidewall of the cooking chamber 6 through which the upper end (typically an outfeed section) 13 of the conveyor 10 extends; a lower sidewall opening 15 through which the lower end (typically an infeed section) 17 of the spiral conveyor 10 extends; a circulation fan 14 for circulating a heating medium (e.g., air, combustion gas, steam, or a combination thereof) 5 through the spiral oven 2; an exterior fan motor 19; one or more indirect heat exchangers, fuel burners, electric elements, thermal oil plated or finned heating exchangers, or other heating devices 21 within the upper circulation and heating chamber 8 for heating the cooking medium 5 used for cooking the food product.

In operation, the food cooking medium 5 is delivered by the circulation fan 14 through the heating device 21 provided in the upper chamber 8 and then is discharged vertically downward into the cooking chamber 6 via either one or more openings in the cooking chamber ceiling 12 or one or more discharge cones 23 extending a short distance downwardly into the cooking chamber 6 above the elevation of the upper end 13 of the conveyor 10. Within the cooking chamber 6, the circulation fan 14 operates to draw the cooking medium 5 inwardly across the 360° spiral flights 18 for convective cooking and then into a vertical return flow path 20 which is surrounded by the spiral conveyor 10.

The spiral conveyor 10 can convey the food product 16 either upwardly or downwardly in the cooking chamber 6 during the cooking process but will typically convey the food product 16 upwardly (a) so that drippage from the raw or partially cooked product entering the oven is not allowed to fall on and contaminate the cooked product exiting the oven and (b) so that the cooked fat which drips from the cooked product will fall on and baste the product as it travels along the lower flights. The spiral conveyor 10 has an axis of rotation (i.e., an axis of spiral travel) 24, typically also corresponding to the longitudinal axis of the vertical return flow passageway 20, around which the food product 16 is conveyed as it is contacted by the cooking medium 5 during the cooking process.

In another type of prior art spiral oven, a plenum is provided outside of one or two side walls of the cooking chamber to draw the cooking medium out of the cooking chamber. Typically, the side wall of the cooking chamber will have openings therethrough and will constitute the inner wall of the plenum. The oven circulation fan(s) will also typically be located inside the plenum.

Heretofore, spiral ovens have had significant shortcomings which have significantly limited the types of cooking operations which can be performed in these ovens and have resulted in (a) significantly non-uniform flow, temperature, and cooking conditions within the cooking chamber 6 and (b) non-uniform cooking results which vary, for example, depending upon whether the food product is conveyed near the inside edge 28, near the outside edge 26, or on the central portion of the spiral conveyor belt 10.

As seen in FIG. 1, the circulation fan 14 of the prior art system 2 operates to draw the cooking medium return flow 27 upwardly through the center of the cooking chamber ceiling 12 and then operates to discharge the heated cooking medium 5 vertically downward into the uppermost end of the cooking chamber 6 through the one or more ceiling openings or cones 23. As will be apparent, the path of least resistance (i.e., the path of lowest pressure drop) is for the cooking medium to simply flow directly through the upper portion of the cooking chamber 6 from the ceiling opening(s) or cone(s) 23 to the circulation fan 14. Consequently, flow rates and temperatures in the lower regions of the cooking chamber 6 can be significantly lower than the flow rates and temperatures experienced in the upper regions of the cooking chamber 6.

In addition, as would be expected with a circulation system of this nature, dead zones are also commonly created at various locations within the cooking chamber 6 where the cooking medium 5 does not freely circulate. Further, the flow patterns which occur across the belt from the outside edge 26 to inside edge 28 can result in the food products placed toward the interior edge 28 of the belt receiving less beneficial conductive heat transfer than the products placed toward the outer edge 26 of the belt, especially in the lower regions of the cooking chamber 6 where lower cooking medium flow rates are experienced. This, in turn, can result in significant differences in cooking uniformity and product appearance.

The limited and non-uniform convective cooking flow circulation systems and patterns provided by the prior art spiral oven 2 also result in slower cooking times and reduced product throughput. Because the convective cooking medium flow rate through the lower regions of the cooking chamber 6 is significantly less than the convective flow rate in the upper regions of the cooking chamber 6, much less cooking occurs in the lower regions of the cooking chamber 6 than in the upper regions. Consequently, the conveyor rate must be slowed so that the product 16 is allowed to spend more time in the upper regions of the cooking chamber 6 than would otherwise be required if the same flow rates and temperatures were experienced in the lower regions of the oven. Further, the conveyor throughput rate must also be slowed to ensure that the product placed closest to the inner edge 28 of the spiral conveyor belt 10 is adequately cooked.

In addition, the available cooking applications for the prior art spiral oven 2 have also been further significantly restricted because the prior art spiral oven 2 is limited to the lateral convective flow of the cooking medium across the spiral flights 18 of the oven 2. Spiral ovens 2 have thus not been able, for example, to provide the surface browning and texture benefits of an impingement-type oven which can impinge the hot cooking medium directly on the surface of the product at a much greater velocity. Rather, heretofore, to obtain any beneficial impingement effects associated with the use of a spiral oven 2, it has been necessary to use one or more additional impingement chambers which impinge hot air or other cooking medium onto the product 16 before it enters the spiral oven 2 and/or as the product is being conveyed from one spiral oven 2 to the next spiral oven 2 in a multi-stage cooking process.

SUMMARY OF THE INVENTION

The present invention provides an improved spiral oven and a method of cooking which satisfy the needs and alleviate the problems discussed above. The advantages and benefits provided by the inventive spiral oven and cooking method include, but are not limited to: increased product throughput and reduced cooking times in the spiral oven; uniform flow and temperature of the cooking medium along the entire length of the spiral conveyor; uniform cooking rates and product appearances across the entire width of the spiral belt; the ability to impinge or otherwise apply the cooking medium directly onto the top, bottom or both the top and the bottom of the product as it is being conveyed over one, more than one, or all of the spiral flights; the ability to change or adjust the degree of impingement by varying the speed of the oven circulation fan and or changing delivery nozzles; greater energy efficiency and reduced generation of greenhouse gases; the creation of new spiral oven cooking methodologies which expand the use of spiral ovens to many additional food products and cooking applications and provide superior cooking results and performance.

In one aspect, there is provided an improvement for a spiral oven of a type for cooking food using a cooking medium wherein the spiral oven comprises a cooking chamber having a spiral conveyor in an interior of the cooking chamber and the spiral conveyor has an upper end at an upper end elevation in the cooking chamber, a lower end at a lower end elevation in the cooking chamber, a plurality of spiral flights, and an axis of spiral travel. The improvement comprises a cooking medium delivery duct structure extending inside the interior of the cooking chamber and having at least one discharge opening for discharging the cooking medium, wherein at least a portion of the discharge opening is elevationally located in the interior of the cooking chamber below the upper end elevation and the discharge opening is oriented for discharging the cooking medium laterally in the cooking chamber with respect to the axis of spiral travel.

In another aspect, there is provided an improvement for a spiral oven of the type for cooking food using a cooking medium wherein the spiral oven comprises a cooking chamber having a spiral conveyor in an interior of the cooking chamber and the spiral conveyor has an upper end at an upper end elevation, a lower end at a lower end elevation, a plurality of spiral flights, and an axis of spiral travel. The improvement comprises a cooking medium delivery duct structure extending downwardly inside the interior of the cooking chamber and having a plurality of discharge openings in the interior of the cooking chamber below the upper end elevation for discharging the cooking medium.

In another aspect, there is provided a method of cooking a food product in a spiral oven. The method comprises the steps of: (a) conveying the food product on a spiral conveyor within an interior of a cooking chamber of the spiral oven, the spiral conveyor comprising a plurality of spiral flights along which the food product is carried and (b) conducting a cooking medium stream into the interior of the cooking chamber via a delivery duct structure in the interior of the cooking chamber which discharges at least a portion of the cooking medium stream into a vertical gap between an adjacent pair of the spiral flights.

In another aspect, there is provided a method of cooking a food product in a spiral oven. The method comprises the steps of: (a) conveying the food product on a spiral conveyor within an interior of a cooking chamber of the spiral oven, the spiral conveyor comprising a plurality of spiral flights along which the food product is carried, the spiral flights being separated by vertical gaps; (b) conducting a first cooking medium stream into the cooking chamber via a first delivery duct structure inside the interior of the cooking chamber which discharges at least a portion of the first cooking medium stream into at least one of the vertical gaps; and (c) conducting a second cooking medium stream into the cooking chamber via a second delivery duct structure inside the interior of the cooking chamber which discharges at least a portion of the second cooking medium stream into at least one of the vertical gaps.

In another aspect, there is provided an improvement for a spiral oven of the type for cooking food comprising a cooking chamber having a spiral conveyor therein comprising a plurality of spiral flights. The improvement comprises a delivery duct structure in the cooking chamber for receiving a stream of the cooking medium, the delivery duct structure including at least one discharge element which extends into a vertical gap between an adjacent pair of the spiral flights for discharging at least a portion of the cooking medium stream within the vertical gap. The improvement also preferably comprises the discharge element being configured for discharging at least a portion of the cooking medium stream downwardly, upwardly, or both downwardly and upwardly within the vertical gap.

In another aspect, there is provided an improvement for a spiral oven of the type for cooking food comprising a cooking chamber having a spiral conveyor therein comprising a plurality of spiral flights. The improvement comprises: (a) a first delivery duct structure in the cooking chamber for receiving a first cooking medium stream, the first delivery duct structure including at least one discharge element that extends into, and is operable for discharging at least a portion of the first cooking medium stream within, a vertical gap between an adjacent pair of the spiral flights and (b) a second delivery duct structure in the cooking chamber for receiving a second cooking medium stream, the second delivery duct structure including at least one discharge element that extends into, and is operable for discharging at least a portion of the second cooking medium stream within, a vertical gap between an adjacent pair of the spiral flights.

In another aspect, there is provided a spiral oven comprising: a cooking chamber; a first spiral conveyor in the cooking chamber; and a second spiral conveyor in the cooking chamber. The second spiral conveyor travels above and in unison with the first spiral conveyor for conveying a food product in the cooking chamber between the first and second spiral conveyors.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 2:
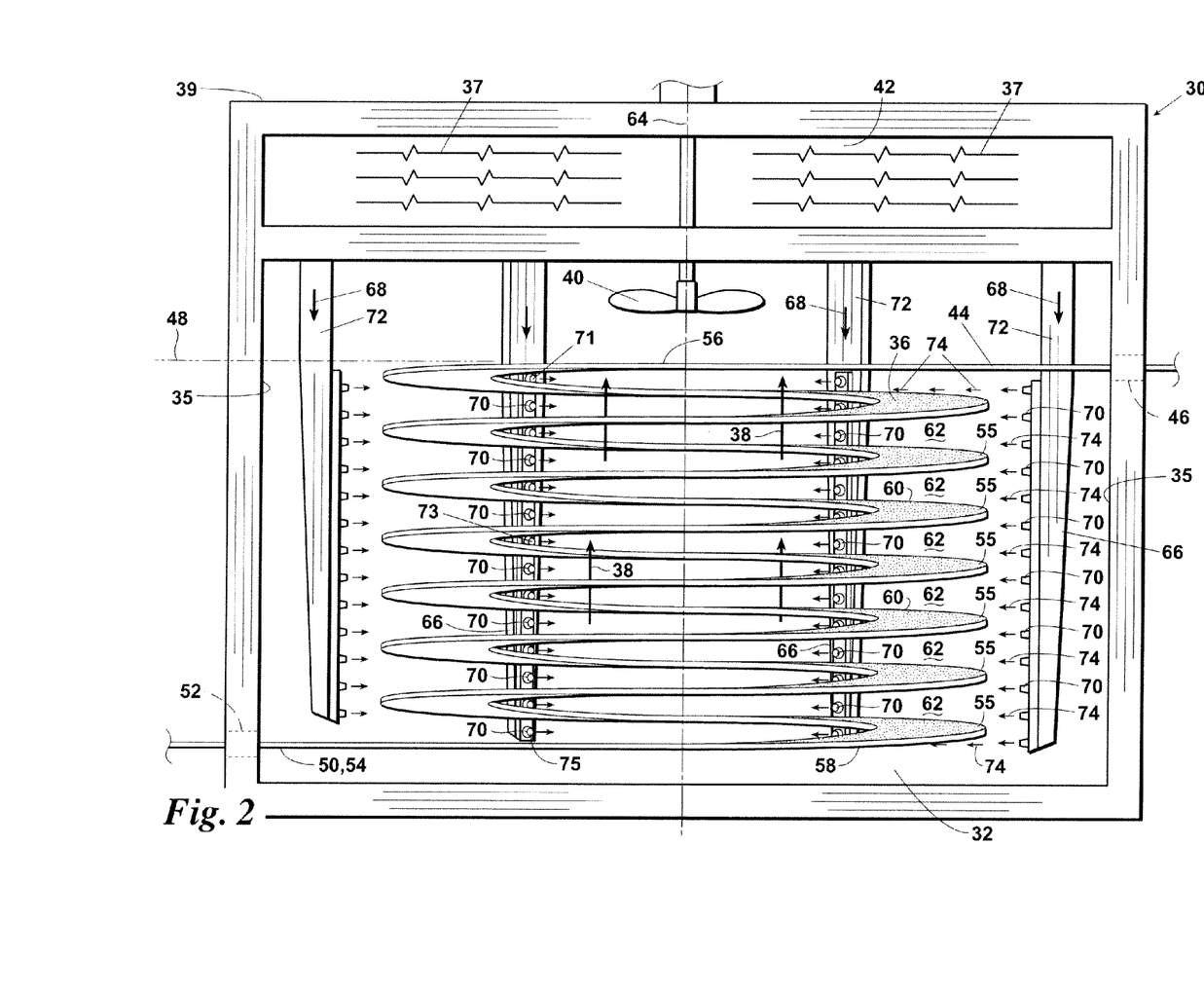
FIG. 2 is a cutaway elevational view illustrating a first embodiment 30 of the inventive spiral oven.

An embodiment 30 of the improved spiral oven provided by the present invention is illustrated in FIG. 2. As with the prior art oven 2, the inventive spiral oven 30 comprises: a cooking chamber 32 having an interior cooking chamber ceiling 34 and interior side walls 35; a spiral conveyor 36 within the interior of the cooking chamber 32 below the ceiling 34; a vertical cooking medium return flow path 38 surrounded by the spiral conveyor 36; and a circulation fan 40 located above the spiral conveyor 36 for drawing the cooking medium upwardly through the return flow path 38 and delivering the cooking medium through any desired type of heating element or system 37 in the upper heating chamber 42 and then into the cooking chamber 32.

Although the housing 39 of the inventive oven 30 includes both a cooking chamber 32 and an upper heating chamber 42, it will be understood that the term "cooking chamber," as used herein and in the claims, refers to the area of the oven wherein the spiral convey 36 is located and the product is cooked and may refer to the entire oven housing 39 or to a portion thereof.

The spiral conveyor 36 comprises: an upper end 44 which enters or leaves an upper opening 46 in the oven housing and is located at an upper end elevation 48; a lower end 50 which enters or leaves a lower opening 52 through the oven housing and is located at a lower end elevation 54; a series of spiral flights (360° revolutions) 55; a number of vertical gaps 62 such that a vertical gap 62 is provided between each adjacent pair of flights 55; and a longitudinal axis of spiral travel 64. The series of spiral flights 55 includes: an uppermost spiral flite 56; a lowermost spiral flite 58; and at least one, typically a plurality, of intermediate spiral flights 60 between the lowermost flite 58 and the uppermost flite 56. The series of 360° spiral conveyor flights 55 surround and define the vertical cooking medium return flow path 38.

In contrast to the prior art oven 2, the cooking medium is not circulated in the cooking chamber 32 of the inventive oven 30 simply by delivering the cooking medium vertically downward into the cooking chamber 32 through one or more holes or short cones in the cooking chamber ceiling 34. Rather, at least some, and preferably all, of the cooking medium is discharged into the interior of the cooking chamber 32 by one or a plurality of delivery duct structures 66 which extend downwardly inside the interior of the cooking chamber 32. The interior delivery duct structures 66 each receive a stream 68 of the heated cooking medium from the upper heating chamber 42 and discharge the cooking medium stream 68 at one or a plurality of locations within the cooking chamber 32 below the upper end elevation 48 of the spiral conveyor 36.

The discharge openings 70 of the delivery duct structures 66 can be apertures, nozzle openings, slots, or any other type of opening effective for providing the amount, location, pattern, and upward, downward, or internal angle of flow desired. The opening(s) 70 will preferably extend below the upper end elevation 48 of the spiral conveyor 36. The opening(s) 70 will more preferably be elevational located such that they extend downwardly in the cooking chamber 32 at least to a lateral plane (i.e., a plane perpendicular to the axis of the spiral travel 64) which is at least 25%, 30%, 50%, or 65%, and most preferably at least 90%, of the distance from the upper end elevation 48 to the lower end elevation 54. In addition, the delivery ducts 66 and the opening(s) 70 provided therein can be identical or can be of differing lengths, configurations, arrangements, or sizes.

In the embodiment 30 shown in FIG. 2, the cooking medium delivery duct structures 66 each comprise an elongate vertical conduit 72 which is located outside of the spiral conveyor 36 and includes a vertical series of nozzles 70. The series of nozzles 70 extends along substantially the entire height of the spiral conveyor 36 from the upper end elevation 48 to the lower end elevation 54 and the nozzles 70 are directed for distributing and discharging the cooking medium stream 68 laterally inward toward the axis of spiral travel 64 (preferably at a lateral angle substantially perpendicular to the spiral axis 64 as illustrated by arrows 74) through the vertical gaps 62 and across the spiral flights 55.

The distribution of the cooking medium throughout the cooking chamber 32 and the uniformity of flow and temperature therein can be further enhanced by deploying a plurality of delivery duct structures 66 around the outside of the spiral conveyor 36 at selected intervals. Further, the configuration of the ducts 66, as well as the size, nature, and spacing of the apertures, nozzles, or other discharge openings 70 of the delivery duct structures 66 can be varied as desired to promote more uniform flow throughout the cooking chamber 32 and to ensure that an excessive amount of the cooking medium does not simply follow a short circuit path across the top of the cooking chamber 32 to the circulation fan 40.

For example, in order to equalize the pressure drop experienced by the cooking medium following the short circuit path in the upper portion of the cooking chamber 32 with that experienced by the cooking medium following the longer flow path through the bottom of the cooking chamber 32, the size of the duct discharge openings 70 can be increased toward the bottom of the delivery duct 66. In this arrangement, an opening 75 located at the bottom end of the delivery duct 66 will be larger than an opening 71 nearest the top end and an opening 73 in the intermediate portion of the delivery duct 66 will also be larger than the upper end opening 71 but will be smaller than the lower end opening 75. Alternatively, or in addition, the spacing of the discharge openings 70 can be reduced toward the lower end of the delivery duct 66 such that more openings are provided per linear foot at the lower end of the duct 66 than nearest the upper end.

It will also be understood that, although the delivery ducts 66 of the inventive oven 30 are positioned outside of the spiral conveyor 36, the flow pattern within the inventive oven 30 could be reversed or otherwise changed such that the delivery duct(s) 66 extend downwardly inside the spiral flights 55 and discharge the cooking medium outwardly.

Figure 3:
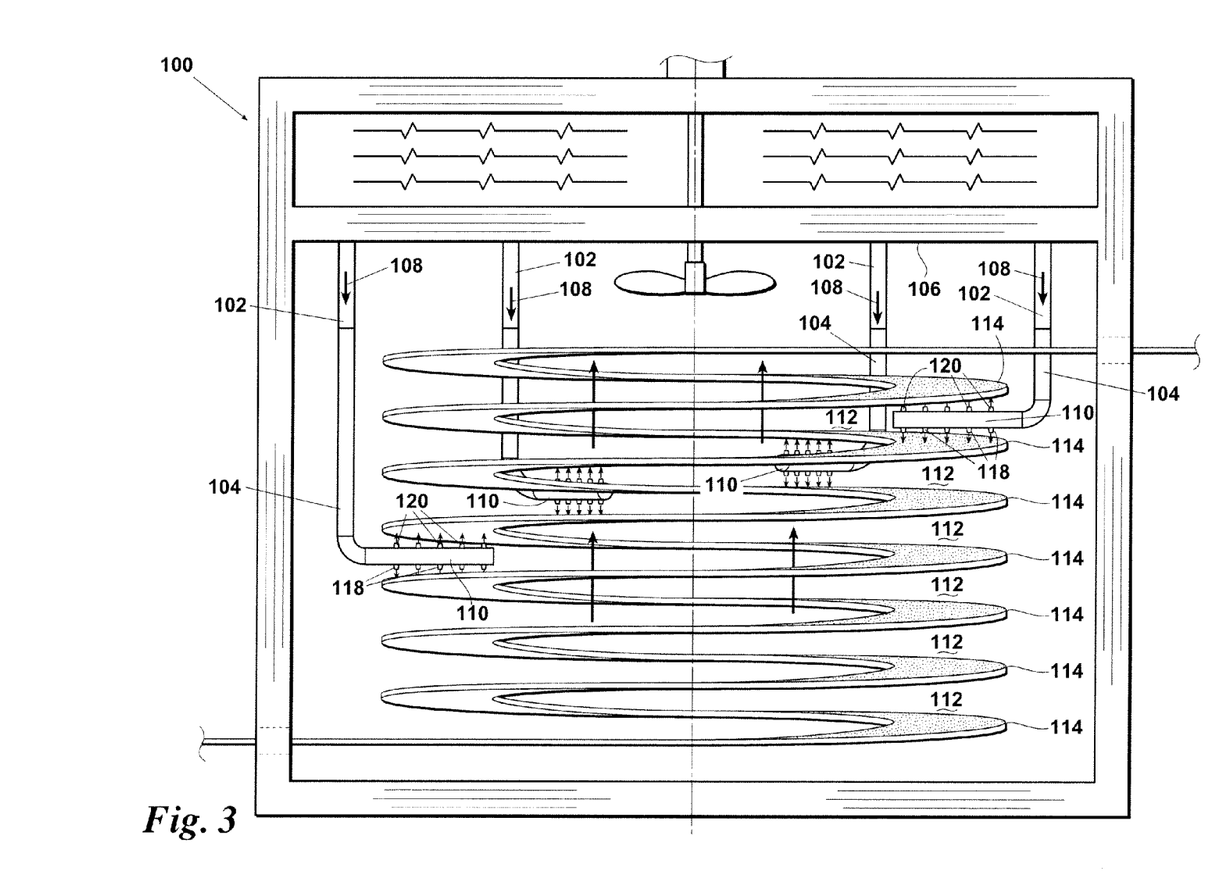
FIG. 3 is a cutaway elevational view illustrating a second embodiment 100 of the inventive spiral oven.

A second embodiment 100 of the inventive improved spiral oven is illustrated in FIG. 3. The spiral oven 100 is identical to the spiral oven 30 except for the configuration and operation of the one or more inventive cooking medium delivery duct structures 102 provided inside the interior of the oven cooking chamber 105. Each delivery duct structure 102 employed in spiral oven 100 includes: (a) a vertical leg 104 which extends downwardly from the cooking chamber ceiling 106 and receives a heated cooking medium stream 108 followed by (b) a lateral leg or other element 110 which extends into and discharges the cooking medium within one of the vertical gaps 112 provided between an adjacent pair of spiral flights 114. If more than one delivery duct structure 102 is employed, the lateral elements 110 of the various delivery duct structures 102 can extend into and discharge the cooking medium within the same vertical gap 112 or within other vertical gaps 112 provided between other adjacent pairs of spiral flights 114.

The delivery duct structures 102 employed in the inventive spiral oven 100 are well suited for providing impingement cooking within the oven. As illustrated in FIG. 3, the lateral element 110 of each delivery duct 102 will preferably have one or more apertures, nozzles, slots, or other openings 118 in the bottom thereof effective for discharging the cooking medium stream 108 downwardly onto the food product as it is being conveyed on the lower one of the adjacent pair of spiral flights 114. The lateral element 110 of the duct 102 will most preferably include a series of lower openings 118 which provide a uniform distribution of the cooking medium stream 108 across the entire width of the conveyor flite 116.

Alternatively, or in addition, one or more upper openings 120 can be provided in the same or different manner along the top of the lateral element 110 of the duct structure 102 for discharging at least a portion of the cooking medium stream 108 upwardly through the upper one of the adjacent pair of flights 114, assuming that a wire mesh or other open belt spiral conveyor 122 is used, onto the bottom of the food product as it is conveyed over the upper flite 114. The upper opening(s) 120 will also preferably provide uniform distribution of the cooking medium beneath the entire width of the upper conveyor flite 114.

The impingement velocity and the pattern provided in the inventive spiral oven 100 can be varied as desired by adjusting the fan speed or by changing the number, size, shape, pattern, etc., of the lower and/or upper apertures, slots, nozzles, or other openings 118 and/or 120.

Figure 4:
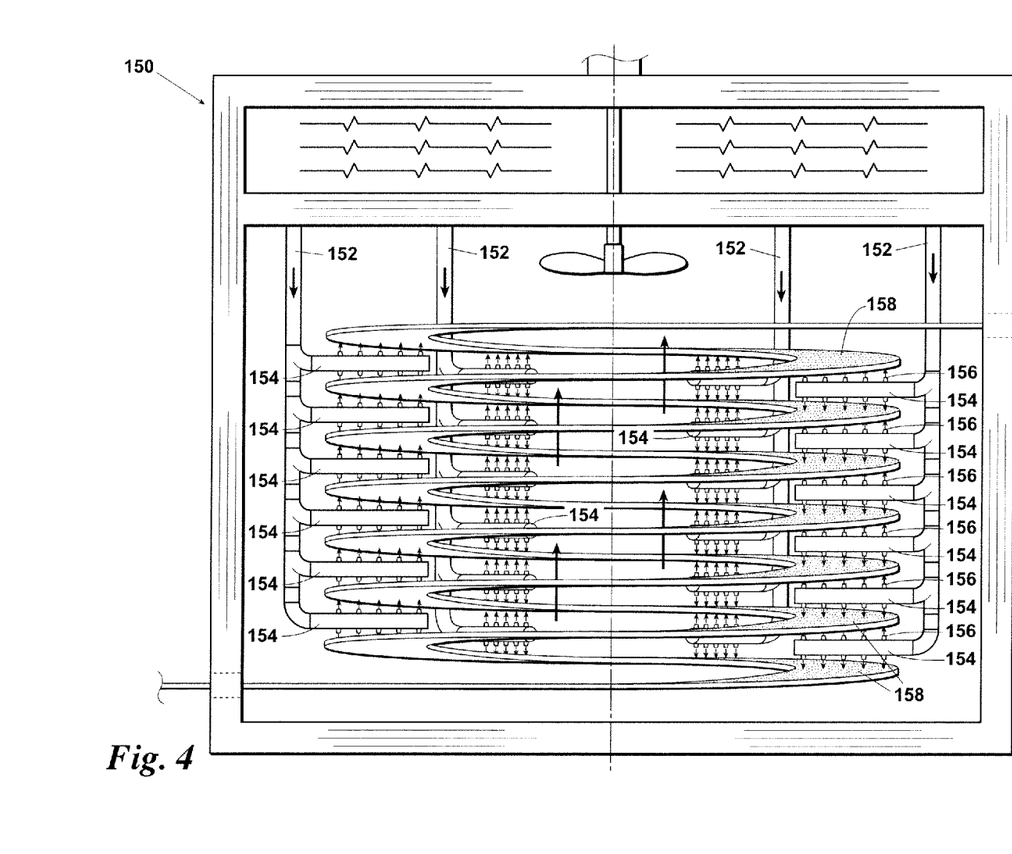
FIG. 4 is a cutaway elevational view illustrating a third embodiment 150 of the inventive spiral oven.

A third embodiment 150 of the inventive spiral oven is illustrated in FIG. 4. The inventive oven 150 is identical to the inventive oven 100 shown in FIG. 3 except that, rather than having only a single discharge element which extends between only one adjacent pair of spiral flights 158, the one or more delivery duct structures 152 of the inventive oven 150 include multiple discharge legs or other elements 154 which extend into the vertical gaps 156 between at least two adjacent pairs, and most preferably between all adjacent pairs, of the spiral flights 158. Each of the discharge elements 154 illustrated in FIG. 4 is a lateral leg which is identical to the lateral leg 110 of the delivery duct structure 102 shown in FIG. 3 which extends from a vertical leg 158. The lateral discharge elements 154 are preferably effective for distributing the cooking medium across the entire width of the belt and for delivering the cooking medium either downwardly, upwardly, or both downwardly and upwardly in the vertical gaps 156.

Although the discharge elements 110 and 154 shown in FIGS. 3 and 4 comprise lateral pipe segments, it will be understood that the discharge elements 110 and 154 used in inventive ovens 100 and 150 can be of any desired type, shape, or discharge configuration effective for being received between a pair of adjacent spiral flights and for distributing the cooking medium stream over any desired area of the spiral conveyor belt and in any desired pattern.

Figure 5:
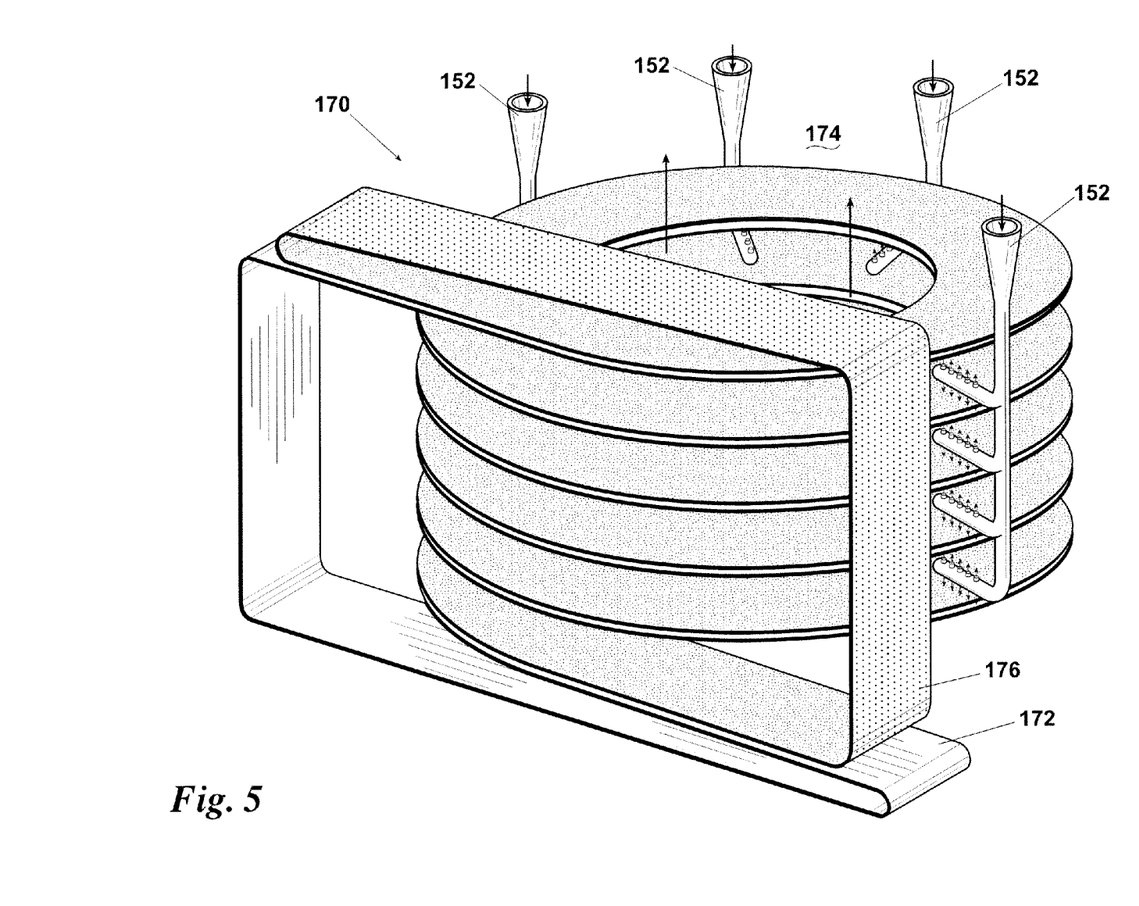
FIG. 5 is cutaway elevational view illustrating a fourth embodiment 170 of the inventive spiral oven.

The cooking chamber interior portion of a fourth embodiment 170 of the inventive improved spiral oven is illustrated in FIG. 5. The inventive spiral oven 170 is identical to the inventive spiral oven 150 shown in FIG. 4 except that the inventive oven 170 shown in FIG. 5 utilizes a unique and novel double belt arrangement. The double belt arrangement employed in inventive spiral oven 170 is particularly well suited for the impingement and improved lateral flow operations provided by the present invention but is also well suited for use in other applications wherein, due for example to the nature of the food product and the cooking medium flow conditions within the spiral oven, the food product is subject to movement and displacement on the spiral belt during the cooking operation.

The inventive spiral oven 170 comprises both a first spiral conveyor 172 which runs through the cooking chamber 174 and a second spiral conveyor 176 which travels within the cooking chamber 174 above and in unison with the first conveyor 172. During operation, the food product is received and carried through the cooking chamber 174 between the lower spiral belt 172 and the upper spiral belt 176. The spacing between the lower belt 172 and the upper belt 176 can be selected to correspond with the size and shape of the food product so that the upper belt 176 is effective for holding the food product in place on the lower belt 172. Also in accordance with the present invention, the upper spiral conveyor 176 and the lower spiral conveyor 172 will preferably each comprise a wire mesh or other open spiral belt which will allow the desired convective or impingement flow of the cooking medium through the upper belt 176 and/or the lower belt 172 onto the top and/or bottom surfaces of the food product.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. In a spiral oven for cooking food using a cooking medium wherein said spiral oven comprises a cooking chamber having a spiral conveyor in an interior of said cooking chamber and said spiral conveyor has an upper end at an upper end elevation in said cooking chamber, a lower end at a lower end elevation in said cooking chamber, a plurality of spiral flights, and an axis of spiral travel, the improvement comprising a cooking medium delivery duct structure having an elongate conduit located outside an outside edge of the spiral conveyor and extending vertically downwardly inside said interior of said cooking chamber from a source of the cooking medium, the elongate conduit having at least one discharge opening for discharging said cooking medium, said cooking medium delivery duct structure running from said source of the cooking medium to said discharge opening and directly conveying the cooking medium to said discharge opening, wherein at least a portion of said discharge opening is elevationally located in said interior of said cooking chamber below said upper end elevation and said discharge opening is oriented for discharging said cooking medium laterally in said interior of said cooking chamber with respect to said axis of spiral travel.

2. The spiral oven of claim 1 wherein the improvement further comprises at least said portion of said discharge opening being elevationally located in said interior of said cooking chamber below a lateral plane which is 25% of a distance downward from said upper end elevation to said lower end elevation.

3. The spiral oven of claim 1 wherein the improvement further comprises at least said portion of said discharge opening being elevationally located in said interior of said cooking chamber below a lateral plane which is 50% of a distance downward from said upper end elevation to said lower end elevation.

4. The spiral oven of claim 1 wherein the improvement further comprises said cooking medium delivery duct structure including a flow discharge nozzle which provides said discharge opening.

5. In a spiral oven for cooking food using a cooking medium wherein said spiral oven comprises a cooking chamber having a spiral conveyor in an interior of said cooking chamber and said spiral conveyor has an upper end at an upper end elevation, a lower end at a lower end elevation, a plurality of spiral flights, and an axis of spiral travel, the improvement comprising a cooking medium delivery duct structure including an elongate conduit located outside an outside edge of the spiral conveyor and extending downwardly inside said interior of said cooking chamber from a source of the cooking medium and having a plurality of discharge openings in said interior of said cooking chamber below said upper end elevation for discharging said cooking medium, said cooking medium delivery duct structure running from said source of the cooking medium to said discharge opening and directly conveying the cooking medium to said discharge openings.

6. The spiral oven of claim 5 wherein the improvement further comprises said cooking medium delivery duct structure including a plurality of flow discharge nozzles which provide said discharge openings.

7. The spiral oven of claim 5 wherein the improvement further comprises said discharge openings of said cooking medium delivery duct structure being arranged as a vertical series of said discharge openings such that said vertical series of discharge openings extends downwardly in said interior of said cooking chamber at least to a lateral plane which is 30% of a distance downward from said upper end elevation to said lower end elevation.

8. The spiral oven of claim 7 wherein the improvement further comprises said lateral plane being 50% of said distance downward from said upper end elevation to said lower end elevation.

9. The spiral oven of claim 8 wherein the improvement further comprises said vertical series of said discharge openings comprising a first of said discharge openings and a second of said discharge openings at an elevation below that of said first of said discharge openings, said second of said discharge openings being larger than said first of said discharge openings.

10. The spiral oven of claim 9 wherein the improvement further comprises said vertical series of said discharge openings further comprising a third of said discharge openings at an elevation below that of said first of said discharge openings and above said elevation of said second of said discharge openings, said third of said discharge openings being larger than said first of said discharge openings and smaller than said second of said discharge openings.

11. The spiral oven of claim 8 wherein the improvement further comprising said cooking medium delivery duct structure being positioned outside of said spiral conveyor and said discharge openings being oriented for discharging said cooking medium laterally inward toward said axis of spiral travel.

12. The spiral oven of claim 11 wherein said spiral conveyor comprises at least five of said spiral flights with vertical gaps provided between said spiral flights and the improvement further comprises:
said vertical series of said discharge openings comprises at least three of said discharge openings and
a lowermost one of said discharge openings being located at an elevational location at least 65% of said distance downward from said upper end elevation to said lower end elevation.

13. The spiral oven of claim 5 wherein the improvement further comprises:
said cooking medium delivery duct structure being a first cooking medium delivery duct structure and
a second cooking medium delivery duct structure extending downwardly in said interior of said cooking chamber and having a plurality of discharge openings in said interior of said cooking chamber below said upper end elevation for discharging said cooking medium.

14. The spiral oven of claim 13 wherein the improvement further comprises:
said discharge openings of said first cooking medium delivery duct structure being arranged as a first vertical series of discharge openings;
said discharge openings of said second cooking medium delivery duct structure being arranged as a second vertical series of discharge openings; and
said first and said second vertical series of discharge openings each extending downwardly in said interior of said cooking chamber at least to a lateral plane which is 30% of a distance downward from said upper end elevation to said lower end elevation.

15. The spiral oven of claim 14 wherein the improvement further comprises said lateral plane being 50% of said distance downward from said upper end elevation to said lower end elevation.

16. The spiral oven of claim 14 wherein the improvement further comprises said first and said second cooking medium delivery duct structures being positioned outside of said spiral conveyor and said first and said second vertical series of discharge openings each being oriented for discharging said cooking medium laterally inward toward said axis of spiral travel.

17. In a spiral oven for cooking food comprising a cooking chamber having a spiral conveyor therein comprising a plurality of spiral flights, the improvement comprising a delivery duct structure in said cooking chamber for receiving a cooking medium stream, said delivery duct structure including an elongate conduit located outside an outside edge of the spiral conveyor and extending from a source of said cooking medium stream and including at least one discharge element that extends into a vertical gap between an adjacent pair of said spiral flights for discharging at least a portion of said cooking medium stream within said vertical gap, said cooking medium delivery duct structure running from said source of the cooking medium to said discharge opening and directly conveying said cooking medium stream to said discharge element.

18. The spiral oven of claim 17 wherein the improvement further comprises said discharge element being configured for discharging at least a portion of said cooking medium stream downwardly, upwardly, or both downwardly and upwardly within said vertical gap.

19. The spiral oven of claim 17 wherein the improvement further comprises said discharge element being a first discharge element, said vertical gap being a first vertical gap, said adjacent pair of said spiral flights being a first pair and said delivery duct structure also including a second discharge element that extends into a second vertical gap between a second adjacent pair of said spiral flights for discharging a portion of said cooking medium stream within said second vertical gap.

20. In a spiral oven for cooking food comprising a cooking chamber having a spiral conveyor therein comprising a plurality of spiral flights, the improvement comprising: a first delivery duct structure in said cooking chamber for receiving a first cooking medium stream, said first delivery duct structure including an elongate conduit located outside an outside edge of the spiral conveyor and having at least one discharge element that extends into, and is operable for discharging at least a portion of said first cooking medium stream within, a vertical gap between an adjacent pair of said spiral flights and a second delivery duct structure in said cooking chamber for receiving a second cooking medium stream, said second delivery duct structure including an elongate conduit located outside the outside edge the spiral conveyor having at least one discharge element that extends into, and is operable for discharging at least a portion of said second cooking medium stream within, a vertical gap between an adjacent pair of said spiral flights, each said cooking medium delivery duct structure running from a source of its respective said cooking medium stream to its respective said discharge element and directly conveying its respective said cooking medium stream to its respective said discharge element.

\* \* \* \* \*